United States Patent [19]

Wagner et al.

[11] 3,850,646

[45] Nov. 26, 1974

[54] LIGHT SENSITIVE PHOTOGRAPHIC ELEMENT

[76] Inventors: Hans Max Wagner, 49 George Fifth Ave.; Wojciech Maria Przezdziecki, 4 Dover Court Gardens, both of Pinner, Middlesex, England

[22] Filed: Mar. 24, 1970

[21] Appl. No.: 20,467

[52] U.S. Cl. .................... 96/115 R, 96/33, 96/35.1, 96/36, 96/36.2, 96/36.3, 96/75, 96/85, 96/86 P, 96/87 R, 96/91 N

[51] Int. Cl. .............................................. G03f 7/08

[58] Field of Search ........... 96/91 N, 115 R, 75, 33, 96/36, 36.3, 36.4

[56] References Cited

UNITED STATES PATENTS

| | | | |
|---|---|---|---|
| 2,461,023 | 2/1949 | Barnes et al. | 96/114 |
| 2,687,958 | 8/1954 | Neugebauer | 96/91 N |
| 2,692,826 | 10/1954 | Neugebauer et al. | 96/91 N X |
| 3,143,423 | 8/1964 | Reynolds et al. | 96/91 N |
| 3,278,305 | 10/1965 | Laridon et al. | 96/91 N |
| 3,312,554 | 4/1967 | Wagner et al. | 96/114 |

OTHER PUBLICATIONS

Kosar, J., "TAGA Proceedings–1965," Tech. Assoc. of the Graphic Arts, Rochester, N.Y., p. 452–462.

*Primary Examiner*—Charles L. Bowers, Jr.
*Attorney, Agent, or Firm*—William H. J. Kline; James R. Frederick

[57] ABSTRACT

Certain aryl azide sensitized polymeric acryloylpeptide derivatives, both as homopolymers and as copolymers with various acryloyl and vinyl derivatives, provide robust, alcohol developable photorisists suitable for use in printing and etching operations.

2 Claims, No Drawings

LIGHT SENSITIVE PHOTOGRAPHIC ELEMENT

This application is continuation of U.S. Ser. No. 602,581, filed Dec. 19, 1966, now abandoned.

This invention relates to the photographic art, and more particularly, to light-sensitive, light-hardenable polymers and photographic elements having said polymers coated thereon, such photographic elements being useful in the photomechanical reproduction art.

Azide sensitized, light-sensitive polymers which are hardened or made insoluble in one or more solvents by the action of actinic radiation are widely used for photomechanical purposes. Such polymers, when coated upon a suitable support, form a photographic element which, upon exposure and development, provides a permanent, image-wise distribution of insolubilized polymer upon said support. Photographic elements of this character can provide a resist image for etching purposes when the polymer, which is unaffected by the etching solution, is coated upon an etchable substrate. In a like manner, one can provide photographic masters for relief printing when the coating is of a requisite thickness. Also, when the water retaining or repelling characteristics of the polymer differ from those of the substrate, photographic masters for lithographic printing can be prepared.

The choice of polymer for the above-mentioned purposes is often governed by the solvent which will be used to dissolve away the unexposed and, therefore, unaffected polymer. Many polymers which are soluble in either water or organic solvents have been used. To the present, however, those organic solvent soluble polymers utilized in photographic elements for photomechanical applications have required a powerful solvent such as benzene or toluene for development.

Such commonly used solvents as benzene and toluene, however, are toxic, and the effects of this toxicity are cumulative. Moreover, the processing of the above-mentioned photographic elements is often handled by persons not versed in the dangers of organic solvents or skilled in their handling.

It is accordingly an object of the instant invention to provide, for photomechanical purposes, new photographic elements whose development is more compatible to the layman processor.

It is another object of the present invention to provide, for photomechanical operations, a novel photographic element employing light sensitive, light hardenable polymers that can be developed by washing in ethyl alcohol.

It is still another object of this invention to provide a new, alcohol-developable photoresist for etching purposes.

Yet another object of the present invention is to provide a novel, alcohol-developable photographic master for relief printing.

An additional object of the present invention is to provide a new, alcohol-developable, photographic master for lithographic printing.

Additional objects will become apparent from a consideration of the following description and examples.

The objects of the present invention are accomplished with acryloylpeptide polymers that can be rendered lightsensitive by the addition of a sensitizing amount of an aryl azide, then coated on a photographic support to form a new photographic element wherein, upon exposure to actinic light, the azide-sensitized polymer becomes insoluble in such monohydric alcohols as methyl alcohol, ethyl alcohol and the like alcohols. This particular insolubilizing property permits the formation of a permanent, image-wise distribution of insolubilized polymer upon said support when the photographic element is washed with the alcohol.

The monomeric units which are used in preparing the light-sensitive polymers utilized in the invention are acryloylpeptide derivatives which when polymerized include the following recurring units:

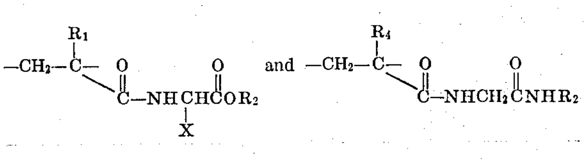

wherein:

A. $R_1$ is a hydrogen atom or a methyl radical
B. $R_2$ is a lower alkyl radical
C. $R_3$ is an alkyl radical having up to seven carbon atoms, or a radical having the formula

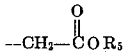

wherein $R_5$ is a lower alkyl radical,
D. $R_4$ is a hydrogen atom or a lower alkyl radical, and
E. X is a group having the formula

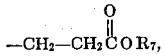

wherein $R_7$ is a lower alkyl radical, a lower alkyl radical, or a hydrogen atom.

The lower alkyl radicals of such acryloylpeptide derivatives suitably have 1 to 4 carbon atoms and include methyl, ethyl, n-propyl, n-butyl, isobutyl, etc.

The synthesis of acryloylpeptide monomers used to prepare the present polymers can be carried out in a number of ways well known to those skilled in the art. Ethyl N-acryloylglycine, for example, can be prepared by the method of Smith and Unruh, (*J. Org. Chem.*, 1958, 23, 301).

The light-sensitive polymers used in the invention can be homopolymers having the above-described acryloylpeptide units or they can be copolymerized with well-known acrylyl and vinyl derivatives which when polymerized include the following recurring units:

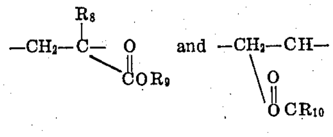

wherein $R_8$ can be a hydrogen atom or a methyl; and $R_9$ and $R_{10}$ can each be lower alkyl radicals, such lower akyl radicals suitably having 1 to 8 carbon atoms and include methyl, ethyl, n-propyl, n-butyl, isobutyl, n-pentyl, n-hexyl, n-heptyl, n-octyl, 2-ethylhexyl, and the like.

In preparing the present polymers, the polymerization can be carried out in accordance with usual practice, such as at an elevated temperature (e.g. 50°C.). The monomers are typically put into solution in methyl or ethyl alcohol or acetone (e.g. 30 percent by weight of monomer) and a polymerization catalyst added (e.g. azo-di-iso butyronitrile).

The polymerization is more generally carried out in an inert atmosphere such as nitrogen and the polymerization carried out until the desired polymer is obtained (e.g. 48–72 hours at 50°C.).

The above-described polymers are soluble in alcohols such as methyl and ethyl alcohol and can be sensitized to light with a wide variety of organic solvent or water soluble aryl azides. Suitable sensitizing azides are those described in German Pat. Nos. 514,657 and 954,308; French Pat. No. 886,716; and British Pat. Nos. 886,100 and 892,811. Particularly useful sensitizers are the aryl azides such as 4,4'-diazidostilbene, described in Hepher and Wagner, U.S. Pat. No. 2,852,379 and 2,6-di-(4'-azidobenzal)-4-methylcyclohexanone, described in Sagura and Van Allen, U.S. Pat. No. 2,940,853. Additional examples are well known in the prior art.

The polymers are sensitized by adding a solution containing a sensitizing amount of the azide to a solution of one of the polymers. The amount of azide sensitizer added can be widely varied in accordance with usual practice, with about 1 to 20 weight percent of azide, based on the polymer's weight, being more generally used.

The sensitized polymer composition can be coated on a wide variety of supports, the nature of the support varying in accordance with usual practice depending on the use to which the photographic element is applied. Metals, such as copper, tin, aluminum and the like can be employed. Glass can also be utilized. Conventional photographic film bases such as cellulose acetate, cellulose nitrate, polyethylene-coated paper, poly(ethylene terephthalate), as well as paper, can be suitably employed as supports in the practice of the invention described herein.

Coating the azide-sensitized polymer onto the support can be carried out by any technique known to those skilled in that art; doctor blades, whirler coaters, hopper coating and even hand swabbing produce satisfactory results. Coating thickness can also be widely varied in accordance with usual practice, coatings typically varying from about 1 mil or less to about 5 mils, depending upon whether the finished element will be used in etching, reflex printing, lithography or the like.

When the photographic element is exposed through a negative, the azide-sensitized polymer in the exposed image areas is rendered insoluble in lower alkyl monohydric alcohols, such as methyl, ethyl, butyl, propyl and the like. Developing the photographic element by washing in the alcohol, therefore produces a permanent, positive image-wise distribution of insolubilized polymer. Such development can be accomplished by spraying, dipping, swabbing, or any technique which brings the solvent in contact for a period of time sufficient to dissolve the unhardened polymer.

The developed photographic element described above can be employed in etching processes such as those used to prepare printed circuits, since the polymer suitably resists the action of such etching solutions as ferric chloride and the like; it can be used as a master for relief printing since the polymer and the unetched substrate beneath provide sufficient height from the etched background substrate for relief printing operations; it also can be used as a lithographic master, since the insolubilized polymer is hydrophobic and ink receptive.

The following examples serve to illustrate particular embodiments of the present invention.

A. Synthesis of Monomers

EXAMPLE I

Ethyl N-acryloylglycine: This compound can be synthesized by the method of Smith and Unruh, (*J. Org. Chem.*, 1958, 23, 301) or by the following adaption of a standard peptide synthesis:

To a stirred ice cooled solution of freshly prepared ethyl glycine (10.3 grams) and acrylic acid (7.2 grams) in methylene chloride (100 ml.) was added dropwise a solution of dicyclohexylcarbodiimide (20.6 grams) in methylene chloride (25 ml.). A reaction sets in and the substituted urea separates. After stirring for 2 hours, the mixture was allowed to stand in the cold overnight, the urea compound was then filtered off and is washed with methylene chloride. The combined solvent was evaporated at 25°–30°C. under vacuum and the residue distilled under vacuum, collecting the fraction b.p. 120°–130°C/0.5 – 2mm. This was redistilled in the presence of a small quantity of hydroquinone, collecting the fraction b.p. 106°–110°C/0.0 – 0.5 mm. Yield (7 grams).

EXAMPLE II

Ethyl N-acryloylglycylglycine: This can be prepared by the method of Smith and Unruh (loc. cit) or more conveniently as follows:

Ethyl glycylglycine hydrochloride was prepared by the method of Schott et al (*J. Org. Chem.*, 1974, 12, 491). The hydrochloride (16 grams) was suspended in ether (150 ml.) and was cooled to 0°C. Simultaneously, acryloyl chloride (7.2 grams) and a solution of potassium carbonate (16 grams) in water (17 ml.) were added dropwise with stirring. After the addition was complete the mixture was stirred for a further 1 ½ hours, at 0°–5°C. The solvents were then evaporated under vacuum at a maximum temperature of 35°C. The residue was extracted with warm acetone, filtered, and the remaining acetone removed under vacuum. The residue was then crystallized twice from acetone. Yield (7 grams) m.p. 147°–151°C. Calc. for $C_9H_{14}N_2O_4$:C, 50.5%; H, 6.54%; N, 13.1%.

Found: C, 50.2%; H, 6.8%; N, 13.0%

EXAMPLE III

N-Acryloyl-N' - Butyl glycinamide: 2-Amino-N-butyl acetamide was prepared by the method of Brunken and Bach. (*Ber.* 1956, 89, 1363). 2-Amino-N-butyl acetamide (13.5 grams) was suspended in ether (100 ml.) and cooled to 0°C. Acryloyl chloride (9 grams) and a solution of potassium carbonate (10 grams) in water (20 ml.) were added dropwise simultaneously with stirring. The mixture was stirred at 0.5°C. for a further 1 ½ hours and was then evaporated to dryness under vacuum at a temperature not exceeding 30°C. The residue was extracted with warm acetone, filtered, and the acetone was evaporated under vacuum. Recrystallization from acetone yielded the product (14 grams) m.p. 135°–136°C. Calc. for $C_9H_{16}N_2O_2$: C, 58.7%; H, 8.70%; N, 15.2%.

Found: C, 58.2%; H, 8.6%; N, 15.0%.

EXAMPLE IV

N-Acryloyl-N'ethylglycinamide was prepared according to the method described in Example III, m.p. 138°–141°C. Calc. for $C_7H_{12}N_2O_2$: C, 53.8%; H, 7.69%; N, 17.94%

Found: C, 53.7%; H, 7.9%; N, 17.9%.

ization periods ranged from 48 to 72 hours depending on the monomers used. Thereafter, the resulting polymers were precipitated in water, washed well with water and then dried. The following table summarizes the polymers prepared. Monomers of the table polymerized and abbreviations therefor.

E.A.G. = Ethyl N-Acryloylglycine
A.B.G. = N-Acryloyl-N'-butyl glycinamide
E.A.G.G. = Ethyl N-Acryloylglycylglycine
A.E.G. = N-Acryloyl-N'-ethylglycinamide
A.H.G. = N-Acryloyl-N'-n-hexylglycinamide
V.A. = Vinyl acetate
E.A. = Ethyl acrylate
B.A. = Butyl acrylate
M.A. = Methyl acrylate
M.M.A. = Methyl methacrylate

| Polymer No. | Monomers Used | Mole Ratio of Monomers | Polymerization Solvent |
|---|---|---|---|
| 1 | E.A. : E.A.G. | 1:1 | Ethanol |
| 2 | E.A. : E.A.G. | 2:1 | Ethanol |
| 3 | V.A. : E.A.G. | 2.2:1 | Ethanol |
| 4 | V.A. : E.A.G. | 1:1 | Ethanol |
| 5 | V.A. : E.A. E.A.G. | 1:1:2 | Ethanol |
| 6 | V.A. : E.A. E.A.G. | 1:1:1 | Ethanol |
| 7 | V.A. : E.A.G. | 2:1 | Acetone |
| 8 | B.A. : E.A.G. | 1:1 | Acetone |
| 9 | E.A. : E.A.G. | 1:1 | Acetone |
| 10 | A.B.G. | | Water |
| 11 | V.A. : E.A.G. | 4:1 | Acetone |
| 12 | E.A. : E.A.G. | 2:1 | Acetone |
| 13 | B.A. : E.A.G. | 2:1 | Acetone |
| 14 | B.A. : E.A.G. | 2:1 | Acetone |
| 15 | B.A. : E.A.G. | 4:1 | Acetone |
| 16 | B.A. : A.B.G. | 4:1 | Acetone |
| 17 | B.A. : E.A.G. | 2:1 | Acetone |
| 18 | B.A. : E.A. : E.A.G. | 3:1:2 | Acetone |
| 19 | B.A. : E.A. : E.A.G. | 3:1:1 | Acetone |
| 20 | B.A. : E.A. : E.A.G. | 1:1:1 | Acetone |
| 21 | B.A. : E.A. : E.A.G. | 2:2:1 | Acetone |
| 22 | B.A. : E.A. : A.B.G. | 3:1:1 | Acetone |
| 23 | B.A. : E.A. : A.B.G. | 2:2:1 | Acetone |
| 24 | E.A. : A.B.G. | 4:1 | Acetone |
| 25 | M.M.A. : A.B.G. | 4:1 | Acetone |
| 26 | M.M.A. : E.A. : A.B.G. | 2:2:1 | Acetone |
| 27 | M.M.A. : E.A.G. | 2:1 | Acetone |
| 28 | M.M.A. : E.A. : E.A.G. | 1:1:1 | Acetone |
| 29 | E.A.G.G. | | water |
| 30 | M.A. : A.B.G. | 4:1 | Acetone |
| 31 | M.A. : A.E.G. | 2:1 | Acetone |
| 32 | M.A. : A.B.G. | 8:1 | Acetone |
| 33 | A.H.G. | | Benzene |
| 34 | M.A. : A.H.G. | 4:1 | Acetone |
| 35 | M.A. : M.M.A. : A.B.G. | 3:1:1 | Acetone |

EXAMPLE V

N-Acryloyl-N'-n-hexylglycinamide was prepared according to the method described in Example III: m.p. 128°–129°C. Calc. for $C_{11}H_{20}N_2O_2$: C, 62.3%; H, 9.5%; N, 13.2%;

Found: C, 62.3%; H, 9.5%; N, 13.1%;

B. Preparation of Polymers

EXAMPLE VI

The monomers prepared as described were copolymerized at 50°C. in a constant temperature waterbath. The monomers were dissolved in acetone or alcohol to make a solution containing about 30 percent of monomer. Azo-di-iso butyronitrile catalyst (0.5% of the total monomers used) was added. The flask was flushed with nitrogen, sealed and placed in the waterbath. Polymer-

C. Preparation of Photographic Element

EXAMPLE VII 8.5 ml. of an ethyl alcohol solution containing 14 percent by weight of Polymer No. 1 identified in the above table was sensitized by the addition of 1.5 ml. of 3 percent by weight solution of 4,4'-diazidostilbene disulphonic acid in 1 percent ammonia. The solution was whirler coated at 200 rpm on a brush-grained and anodized aluminum sheet. After drying, the layer was exposed for 5 minutes to a bank of four 125 watt high pressure mercury vapor lamps placed 18 inches from the exposing frame through a conventional neutral density photographic step wedge with 0.15 increments in density. After development for 30 secs. by washing with ethyl alcohol containing a small amount of methyl violet dye, exposure steps up to No. 7 were found to be retained.

EXAMPLE VIII

The coating described in Example 1 was whirler coated onto 0.001 in. copper laminated to a film support (0.003 in. thick poly(ethylene terephthalate) film clad on one side with 1 oz./ft.$^2$ copper foil), and exposed as described in Example VII through a line copy original. After development in ethyl alcohol as described in Example VII, and drying, the copper was removed in the unexposed areas by spraying with 35° Be ferric chloride for 3 min. No breakdown of the resist polymer stencil occurred in the areas of exposure.

EXAMPLE IX

An 8.5 ml. portion of an 8 percent by weight ethyl alcohol solution of Polymer No. 3 identified in the above table was sensitized by the addition of 1.5 ml. of 3% solution of 4,4'-diazidostilbene disulphonic acid in 1 percent ammonia. The solution was coated on aluminum, the layer exposed and developed in ethyl alcohol as in Example VII. Eight of the 0.15 increment density exposure steps were retained on the aluminum.

EXAMPLE X

The coating solution as described in Example IX was coated and processed as in Example VIII. A sharp reproduction of the line original was obtained, no breakdown of the exposed, image-wise resist occurring.

EXAMPLE XI

To 10 ml. of 5 percent by weight ethyl alcohol solution of Polymer No. 11 identified in the above table was added 0.025 gram of 2,6-di(4'-azidobenzylidene)-4-methylcyclohexanone, and the resulting solution was swabbed on a sheet of brushed-grained and anodozied aluminum. The sheet was exposed through a negative for 5 min. and then developed by spraying with methyl alcohol, polymers in the unexposed area being removed by the methyl alcohol solvent. The resulting lithographic print plate gave 500 copies on an offset lithographic printing machine without any noticable deterioration of either the image on the plate or the resulting offset copies.

EXAMPLE XII

To 10 ml. of 10 percent by weight methyl alcohol solution of Polymer No. 26 as described in the above table, was added 0.66 ml. of 3 percent solution of 2,6-di(4'-azidobenzylidene)-4-methylcyclohexanone in cyclohexanone. The resulting solution was coated on a 0.001 inch copper laminate of the type described in Example VIII by whirling at 150 rpm. After drying, the resulting polymer layer was image-wise exposed for 5 min. to a bank of four 125 watt high pressure mercury vapor lamps placed 18 inches from the exposing frame. The exposed polymer layer was developed for 2 min. in ethyl alcohol to remove unexposed polymer. The resulting bared copper substrate in unexposed areas was spray-etched to remove the copper using 35° Be ferric chloride. No breakdown of the resist image occurred during the etching.

EXAMPLE XIII

The coating solution of Example XII was applied by swabbing to a sheet of brush-grained and anodized aluminum plate. After drying, the plate was exposed as described in Example XII through a negative and developed by spraying with ethyl alcohol to remove unexposed polymer as described in Example XII. The resulting plate containing a hardened polymer image in the areas of exposure was placed on an offset lithographic printing machine and swabbed with 2 percent phosphoric acid solution prior to ink application. About 1,000 ink copies were produced, no deterioration of the image occurring. Similar results were obtained by developing the exposed photographic element by swabbing with a cotton wool pad soaked in ethyl alcohol.

The present invention thus provides a novel photographic element which has particular utility in photomechanical applications where processing simplicity is desirable. It has been described in considerable detail with particular reference to preferred embodiments thereof, but it will be understood that variations and modifications can be effected within the spirit and scope of the invention as described above and as defined in the appended claims.

We claim:

1. A photographic element comprising a support having coated thereon a light-sensitive layer comprising a polymer that is soluble in lower alkyl monohydric alcohols and a sensitizing amount of aryl azide having organic solvent solubility, such that in the layer, exposed azide-sensitized polymer is rendered insoluble in lower alkyl monohydric alcohols, said polymer being selected from the group consisting of copolymers comprising:

I. from 10 to 75 mole percent of at least one recurring acryloylpeptide unit having a formula selected from the group consisting of:

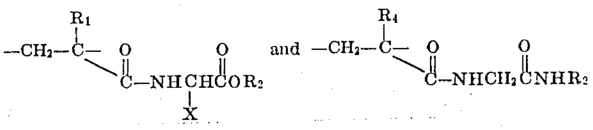

wherein:

A. $R_1$ is selected from the group consisting of: 1. a hydrogen atom, and 2. a methyl radical;

B. $R_2$ is a lower alkyl radical;

C. $R_3$ is selected from the group consisting of:

1. an alkyl radical having from one to seven carbon atoms, and
2. a radical having the formula $$-CH_2-\overset{O}{\overset{\|}{C}}OR_5$$

wherein $R_5$ is a lower alkyl radical;

D. $R_4$ is selected from the group consisting of:

1. a hydrogen atom, and
2. a lower alkyl radical;

E. X is selected from the group consisting of:

1.

$$-CH_2-CH_2\overset{O}{\overset{\|}{C}}OR_7,$$

wherein $R_7$ is a lower alkyl radical;

2. a lower alkyl radical, and
3. a hydrogen atom; and

II. from 25 to 90 mole percent of at least one recurring unit having a formula selected from the group consisting of:

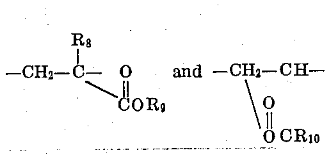

A. $R_8$ is selected from the group consisting of:
1. a hydrogen atom, and
2. a methyl radical; and B. $R_9$ and $R_{10}$ are each a lower alkyl radical having 1 to 4 carbon atoms.

2. A photographic element comprising a support having coated thereon a light-sensitive layer comprising a polymer that is soluble in lower alkyl monohydric alcohols and a sensitizing amount of aryl azide having organic solvent solubility, such that in the layer, exposed azide-sensitized polymer is rendered insoluble in lower alkyl monohydric alcohols, said polymer being selected from the group consisting of the copolymerization products of ethyl-N-acryloylglycine and vinyl acetate, ethyl N-acryloylglycine and butyl acrylate, ethyl N-acryloylglycine and ethyl acrylate and N-acryloyl-N'-butyl glycinamide, methyl methacrylate and ethyl acrylate.

* * * * *

PO-1050
(5/69)

UNITED STATES PATENT OFFICE
CERTIFICATE OF CORRECTION

Patent No. 3,850,646 Dated November 26, 1974

Inventor(s) Hans M. Wagner and Wojciech M. Przezdziecki

It is certified that error appears in the above-identified patent and that said Letters Patent are hereby corrected as shown below:

Title page, abstract, line 4, "photorisists" should read ---photoresists---;

Column 1, line 64, "lightsensitive" should read ---light-sensitive---;

Column 2, line 16, that part of formula reading:

" $NHCH_2\overset{O}{\overset{\parallel}{C}}NHR_2$ " should read --- $NHCH_2\overset{O}{\overset{\parallel}{C}}NHR_3$ ---;

Column 2, last line, that part of formula reading:

" $\overset{O}{\overset{\parallel}{OCR_{10}}}$ " should read --- $\overset{O}{\overset{\parallel}{OCR_{10}}}$ ---;

Column 4, line 45, "1974" should read ---1947---;

Column 7, line 35, "anodozied" should read ---anodized---;

Column 8, line 38, that part of formula reading:

" $NHCH_2\overset{O}{\overset{\parallel}{C}}NHR_2$ " should read --- $NHCH_2\overset{O}{\overset{\parallel}{C}}NHR_3$ ---

Column 9, line 8, that part of formula reading:

" $\overset{O}{\overset{\parallel}{OCR_{10}}}$ " should read --- $\overset{O}{\overset{\parallel}{OCR_{10}}}$ ---.

Signed and sealed this 29th day of April 1975.

(SEAL)
Attest:

RUTH C. MASON
Attesting Officer

C. MARSHALL DANN
Commissioner of Patents
and Trademarks